Aug. 31, 1948.　　　V. V. DAVIS　　　2,448,084
SCANNING CAMERA
Filed April 2, 1945　　　　　　　　　4 Sheets-Sheet 1
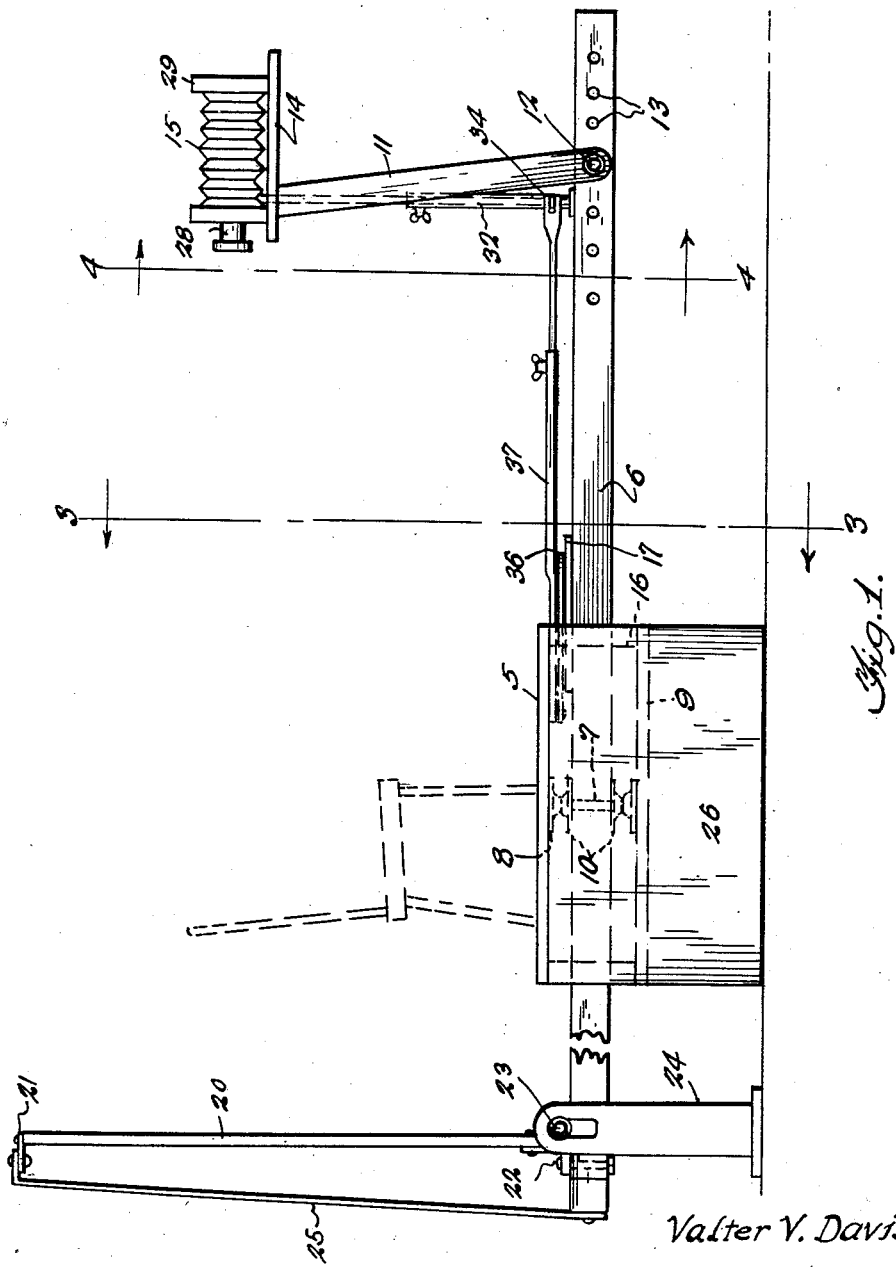
Inventor
Valter V. Davis.
By *Clarence A. O'Brien and Harvey B. Jacobson*
Attorneys

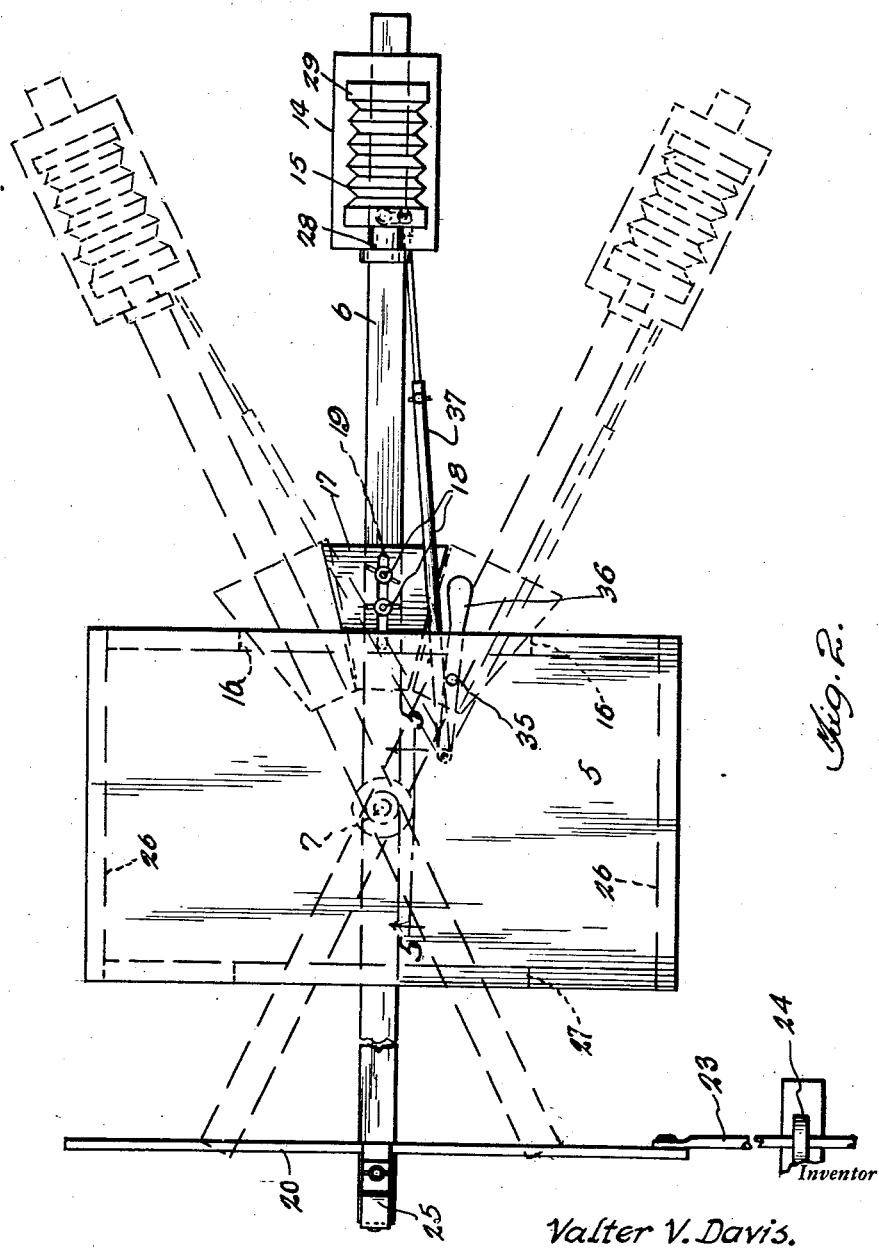

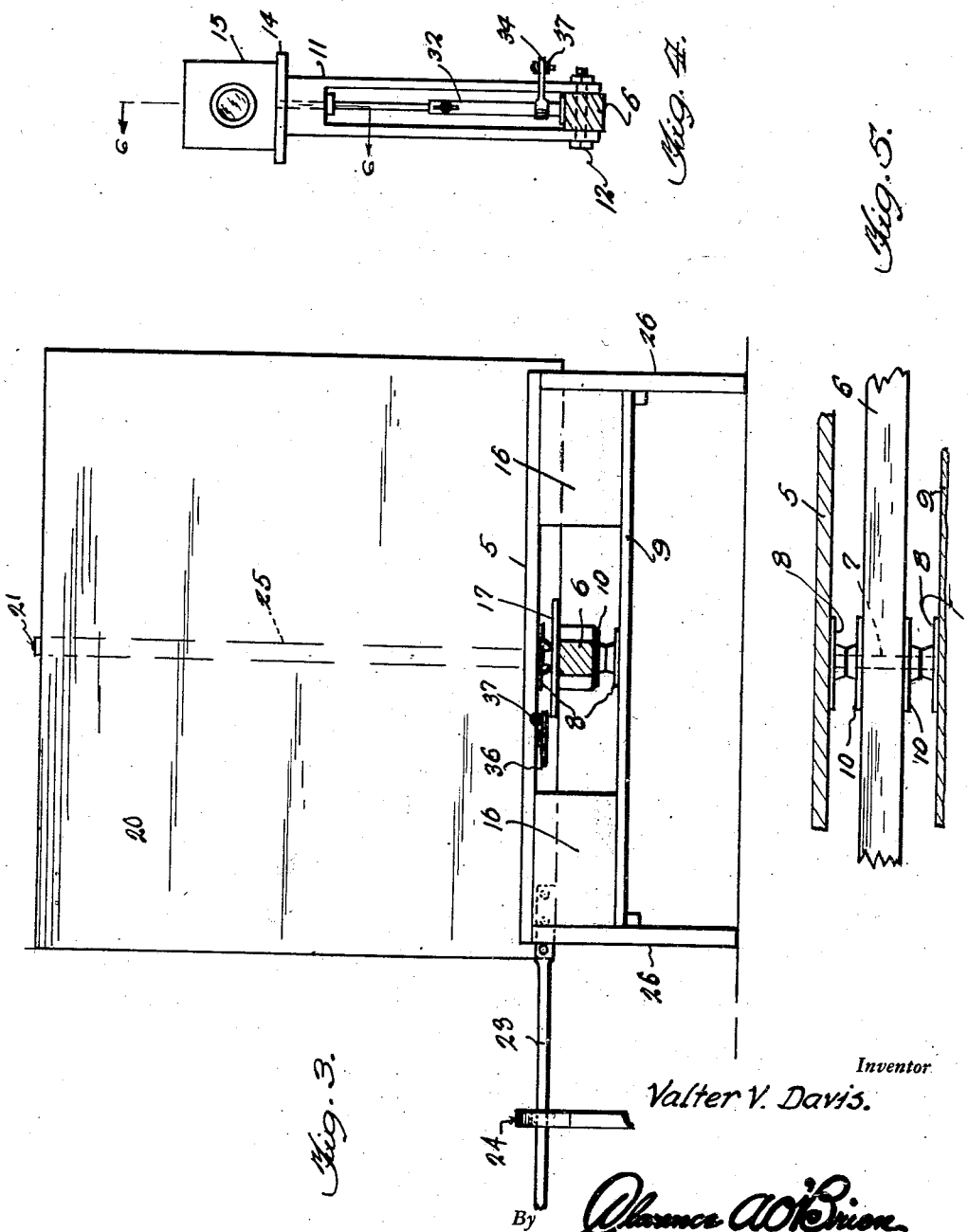

Aug. 31, 1948.  V. V. DAVIS  2,448,084
SCANNING CAMERA
Filed April 2, 1945  4 Sheets-Sheet 4

Inventor
Valter V. Davis.
By
Attorneys

Patented Aug. 31, 1948

2,448,084

UNITED STATES PATENT OFFICE 2,448,084

SCANNING CAMERA

Valter V. Davis, Tuscaloosa, Ala.

Application April 2, 1945, Serial No. 586,137

3 Claims. (Cl. 95—15)

This invention relates to an improved photographing apparatus, and an object of the invention is to provide a device whereby an ordinary single-lens camera may be focused from any point along the arc of a circle with the subject approximately at its center, so that the camera need only be focused once for taking views of the subject at different angles, or whereby the camera may be used for photographing successive portions of the subject on successive portions of the sensitized element of the camera from successive points along the arc to obtain a composite photograph having the appearance of depth.

A more specific object of the invention is to provide a device of the above kind including a horizontal beam mounted to swing in an arc about a vertical axis, a camera support carried by and movable with the beam and located at a point removed from the pivotal axis of the latter, and a camera carried by said camera support and arranged so that its focal axis is in line with the pivotal axis of the beam, whereby views may be taken at different angles by the camera of a subject located approximately at the pivotal axis of the beam.

A further object of the invention is to provide a device of the above kind in which the beam is pivotally mounted at a point intermediate its ends, wherein the camera is mounted on one end portion of the beam, wherein a vertical background wall or screen is mounted upon the other end portion of the beam for turning relative to the latter about a vertical axis, and wherein means is provided to automatically turn the background wall relative to the beam so as to constantly maintain said wall parallel with a given vertical plane when the beam is swung horizontally for adjustment to different angular positions relative to the subject.

Still another object of the invention is to provide means for conveniently adjusting the camera support longitudinally of the beam for taking pictures at different focal distances.

A still further and important object of the invention is to provide a device whereby an ordinary single lens camera may be moved in an arc of a circle with the subject approximately at the center of the arc and during exposure of the sensitized element in the camera, so that the composite view taken from all points of the arc will present a picture having the appearance of depth somewhat similar to that provided by stereoscopic pictures.

The invention comprehends a device of the kind specified in the preceding object, wherein the camera is equipped with a swinging image distributor of a form to restrict passage of the images to definite different portions of the sensitized element, and wherein means is provided for automatically swinging the image distributor as the camera is moved in the arc. In this way and by this means, the images of different portions of the subject received at different points along the arc are distributed to succeeding portions of the sensitized surface, with the result that the composite view ultimately taken is entirely clear or unblurred.

Still another object of the invention is to provide means for adjustably limiting the length of the arc in which the camera may be swung by adjustably limiting the degree of swinging movement of the beam.

Still another object of the invention is to provide means for varying the degree and speed of movement of the image distributor relative to the degree and speed of movement of the beam, whereby the device may be used for taking pictures with different degrees of depth appearance and so that the time of exposure may be changed to suit conditions and requirements.

Other objects and features of the invention will become apparent from the following description when considered in connection with the accompanying drawings, and the invention consists in the novel form, combination and arrangement of parts hereinafter more fully described, shown in the accompanying drawings and claimed.

In the drawings, wherein like reference characters indicate corresponding parts throughout the several views:

Figure 1 is a side elevational view, partly broken away, of one form of apparatus embodying the present invention.

Figure 2 is a top plan view thereof.

Figure 3 is a vertical transverse section taken on line 3—3 of Figure 1.

Figure 4 is a vertical transverse section taken on line 4—4 of Figure 1.

Figure 5 is a fragmentary vertical longitudinal section taken on line 5—5 of Figure 2, and drawn on an enlarged scale.

Figure 6:
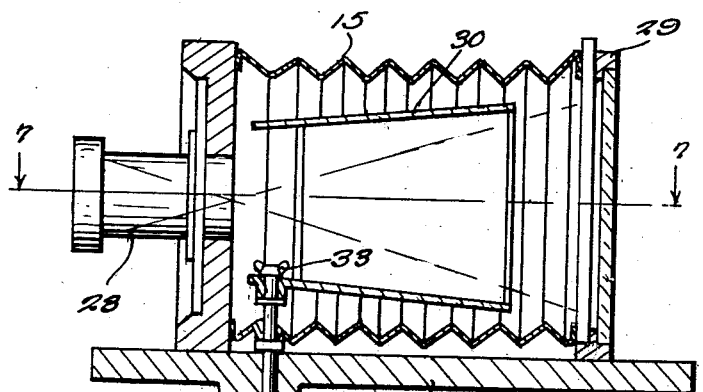
Figure 6 is an enlarged fragmentary vertical section taken on line 6—6 of Figure 4.
Figure 7:
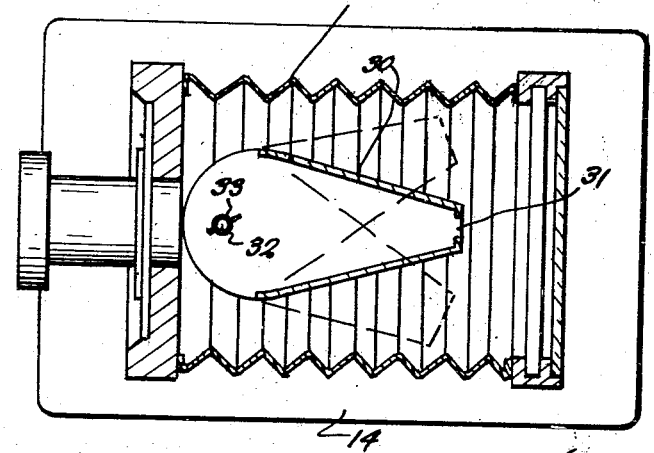
Figure 7 is a horizontal section taken on line 7—7 of Figure 6.
Figure 8:
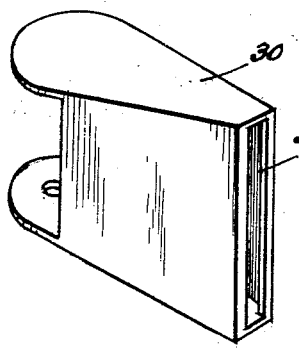
Figure 8 is an enlarged perspective view of the image distributor.

Referring in detail to the drawings, the illustrated embodiment of the invention includes a floor or platform 5 on which the subject is to be located while being photographed. Pivotally mounted intermediate its ends and beneath the floor or platform 5 is a horizontal beam 6 adapted to be swung horizontally in the arc of a circle, as indicated in Figure 2. The pivot for the beam 6 may vary in construction, but is shown as including a vertical pivot pin 7 passing through the beam 6 and having bearing members 8 on the ends thereof which are respectively secured to the under side of the floor or platform 5 and to the upper surface of a horizontal support 9 suitably rigidly mounted in spaced relation to and beneath the floor or platform 5. The bearing members 8 coact with similar bearing members 10 secured upon the upper and lower faces of the beam 8, whereby free and noiseless movement of the beam is promoted.

Mounted upon one end portion of the beam 6 is a camera support which is shown as comprising a bifurcated upright 11 whose lower end straddles the beam 6 and is secured to the latter by means of a bolt 12 passing through the legs of the upright and the beam. The beam 6 is provided with a longitudinal series of uniformly spaced openings 13 for selective reception of the bolt 12 whereby the camera support may be adjusted relative to the beam at different distances from its pivotal axis. A plate 14 is fixed on the upper end of the upright 11 and has an ordinary single-lens camera 15 mounted thereon so that its focal axis is in line with the pivotal axis of the beam 6. Stationary stop members 16 are mounted at opposite sides of the beam 6 for limiting the horizontal swinging movement of the latter. A forwardly tapering horizontal plate 17 is mounted upon the beam 6 and is of a width to project beyond opposite sides of the latter as well as being located between the stop members 16 to coact with the latter in limiting the swinging movement of the beam. The plate 17 is adjustable longitudinally of the beam 6 for adjustably limiting the degree of swinging movement permitted for the beam 6. Adjustment of plate 17 may be effected by bolting it to the beam at 18, the bolts extending through a longitudinal elongated slot 19 of the plate. Obviously, when the plate 17 is adjusted forwardly, its wider portion is disposed to engage the stop members 16 and swinging movement of the beam 6 is limited to a lesser distance than when the plate 17 is adjusted rearwardly so as to dispose its forward narrower portion between the stop members 16.

Mounted upon the other end of beam 6 is a vertical background wall or screen 20 that acts to counterbalance the beam 6 by equalizing the weight at opposite sides of the pivot of said beam. The background wall or screen 20 is pivotally mounted at 21 and 22 at a point midway between the sides thereof for turning about a vertical axis relative to the beam 6 so that it may be maintained at all times parallel with a given transverse vertical plane. In order to maintain the background wall or screen 20 parallel to such plane by turning it relative to the beam 6 as the latter is swung horizontally, an arm 23 is rigid with and projects laterally from one side of the background wall or screen 20 and slidably extends through a stationary guide 24 suitably mounted in the required position. In this way, lateral movement of the wall or screen 20 is permitted and it is caused to change angular relation with respect to the beam 6 as the latter is swung horizontally, for maintaining said wall or screen parallel with the given plane as mentioned. Wall or screen 20 may be suitably braced in its vertical position, as at 25, and it will be seen that it may furnish a desired background for the subject when the latter is photographed while occupying a position on the floor or platform 5 between the camera and said wall or screen 20 and approximately at the pivotal axis of the beam 6 in line with said axis and the focal axis of the camera. As shown, the floor or platform 5, the support 9 and the stop members 16 may form part of a box-like structure having side walls 26 and a rear wall slotted, as indicated at 27 by dotted lines in Figure 2, so as to not interfere with the horizontal swinging movement of the beam 6.

Mounted within the casing of the camera between the lens holder 28 and the holder 29 for the sensitized plate or element is a laterally swinging image distributor or scanning element 30 consisting of a hollow member which is flat vertically, open at its forward pivoted end, and provided with a central vertically elongated narrow slot 31 in its rear end. This image distributor or scanning element is arranged centrally between the sides of the camera so that the images of successive portions of the subject may pass therethrough from the camera lenses to the sensitized element when the camera is swung laterally. The slot 31 is of a selected size to properly restrict the images to reception on predetermined portions of the sensitized element, for a purpose which will be presently described. As shown, the image distributor or scanning element preferably tapers narrower rearwardly from its pivoted end, and the rear end of the image distributor or scanning element is arranged in reasonably close proximity to the sensitized element or plate which is placed in the camera.

A vertical shaft 32 is journaled in the upper portion of the upright 11 and projects into the camera, the image distributor being detachably secured upon the upper end of the shaft 32, as at 33. Shaft 32 is of telescopic construction so as to be adjustable in length, and its lower end terminates directly above the beam 6 and has a laterally projecting arm 34 fixed thereon.

Pivotally mounted beneath the floor or platform 5 intermediate its ends and as at 35 is a horizontally swinging hand lever 36. The forward end of lever 36 is connected by a rod or link 37 with the crank arm 34, and the lever 36 is located to one side of the beam 6 so that the pivotal connection of rod 37 with lever 36 is disposed to one side of the pivotal axis of the beam 6, as shown in Figure 2. Any suitable means may be provided to retain the lever 37 in any position to which it may be swingingly adjusted about its pivot. The arrangement is such that when the beam 6 is swung horizontally, the image distributor or scanning element is simultaneously swung laterally in an opposite direction. Also, by adjusting the lever 36, its point of pivotal connection with the rod 37 may be adjusted to different distances from the pivotal axis of the beam 6 so as to vary the degree and speed of movement of the image distributor with respect to the degree and speed of movement of the beam 6. This is effected in direct relationship to the adjustment of the plate 17 which limits the degree of swinging movement of the beam 6 and the time of exposure required of the sensitized element on which the picture is being taken. Of course, care will be exercised so as to swing the beam 6 laterally at a steady or uniform and approximately predetermined speed. In taking the composite pictures, successive portions of the sensitized element in the camera are exposed during the swinging movement of the beam 6 from one limit of movement to the other. As the beam is swung horizontally, the images of successive portions of the subject pass through the image distributor and are successively received on successive portions of the sensitized element as the angle of exposure changes during movement of the camera with the beam. By the use of the image distributor or scanning element, it is thus possible to obtain a composite picture or view of the subject which is clear and unblurred. As the picture is composed of images of different portions of the subject taken from different points along an arc and therefore at different angles with respect to the subject, a single composite picture results having pronounced depth appearance.

For slight adjustments in the focal distance between the subject and the camera, the upright 11 may be adjustably tilted forwardly or rearwardly about the bolt 12, and the rod 37 is of telescopic form so as to be adjustable in length to permit this to be done. The adjustable telescopic form of shaft 32 also takes care of changes in relation of parts at this time. The action of the operating means for the image distributor will be readily understood when it is considered that the point of connection of rod 37 with the lever 36 is eccentrically disposed with respect to the pivotal axis of the beam 6. Also, the handle end of lever 36 projects rearwardly beyond the rear portion of the platform or floor 5 where it is exposed to be grasped and adjusted.

The present device may be used to take a plurality of pictures of a subject, each at a different angle or from a different point upon the arc of a circle, with no depth effect. This may be accomplished by simply removing the image distributor or scanning element from the shaft 32 and allowing the beam 6 to remain in a stationary position during exposure of each sensitized element within the camera, a new or different sensitized element being provided for each picture. Obviously, the invention may find embodiment in many different forms of construction, and various changes may be made in details of construction illustrated and described, such as fall within the spirit and scope of the invention as claimed.

The operation of the device having been explained during description of the construction, it is believed that the operation and advantages of the invention will be readily understood and appreciated by those skilled in the art.

What I claim is:

1. A photographing apparatus comprising a fixed support, a horizontal beam pivotally mounted upon said support for horizontal swinging movement about a vertical axis, a camera support carried by and projecting upwardly from said beam and mounted on the latter at a point removed from said axis, a fixed support for the subject to be photographed located coincident with said axis, a single lens camera mounted on top of said camera support and arranged to focus upon a subject located substantially at said axis, an image distributor mounted in the camera for swinging movement about a vertical axis and constructed to restrict passage of the image of a portion of the subject onto a restricted portion of the surface of a sensitized element placed in the camera, and connecting means operatively connecting said fixed support to the image distributor for automatically swinging the latter about its axis when the beam is swung horizontally, so that the images of successive portions of the subject are received upon successive different portions of the sensitized element as the angle of exposure changes, whereby to secure a composite having depth appearance upon continued exposure during swinging movement of the beam.

2. A photographing apparatus comprising a fixed support, a horizontal beam pivotally mounted upon said support for horizontal swinging movement about a vertical axis, a camera support carried by and projecting upwardly from said beam and mounted on the latter at a point removed from said axis, a fixed support for the subject to be photographed located coincident with said axis, a single lens camera mounted on top of said camera support and arranged to focus upon a subject located substantially at said axis, an image distributor mounted in the camera for swinging movement about a vertical axis and constructed to restrict passage of the image of a portion of the subject onto a restricted portion of the surface of a sensitized element placed in the camera, and connecting means operatively connecting said fixed support to the image distributor for automatically swinging the latter about its axis when the beam is swung horizontally, so that the images of successive portions of the subject are received upon successive different portions of the sensitized element as the angle of exposure changes, whereby to secure a composite picture having depth appearance upon continued exposure during swinging movement of the beam, said connecting means being adjustable to vary the speed of movement of the image distributor relative to the speed of movement of the beam.

3. A photographing apparatus comprising a fixed support, a horizontal beam pivotally mounted upon said support for horizontal swinging movement about a vertical axis, a camera support carried by and projecting upwardly from said beam and mounted on the latter at a point removed from said axis, a fixed support for the subject to be photographed located coincident with said axis, a single lens camera mounted on top of said camera support and arranged to focus upon a subject located substantially at said axis, an image distributor mounted in the camera for swinging movement about a vertical axis and constructed to restrict passage of the image of a portion of the subject onto a restricted portion of the surface of a sensitized element placed in the camera, and connecting means operatively connecting said fixed support to the image distributor for automatically swinging the same about its axis when the beam is swung horizontally, so that the images of successive portions of the subject are received upon successive different portions of the sensitized element as the angle of exposure changes, whereby to secure a composite picture having depth appearance upon continued exposure during swinging movement of the beam, said connecting means being adjustable to vary the speed of movement of the image distributor relative to the speed of movement of the beam, and an adjustable stop carried by the beam and coacting with the support to adjustably limit the degree of movement of the beam.

VALTER V. DAVIS.

REFERENCES CITED

The following references are of record in the file of this patent:

UNITED STATES PATENTS

| Number | Name | Date |
|---|---|---|
| 1,312,674 | Beyer | Aug. 12, 1919 |
| 1,576,340 | Le Provost | Mar. 9, 1926 |
| 1,900,562 | Kanolt | Mar. 7, 1933 |
| 1,977,310 | Kanolt | Oct. 16, 1934 |
| 2,140,602 | Simjian | Dec. 20, 1938 |
| 2,148,011 | Burke | Feb. 21, 1939 |
| 2,158,660 | Kanolt | May 16, 1939 |
| 2,175,114 | Friedmann et al. | Oct. 3, 1939 |
| 2,179,657 | Estey | Nov. 14, 1939 |
| 2,279,646 | Smith | Apr. 14, 1942 |
| 2,282,337 | Mies | May 12, 1942 |
| 2,386,276 | Simjian | Oct. 9, 1945 |